(12) United States Patent  (10) Patent No.: US 7,649,904 B1
Ghosh et al.  (45) Date of Patent: Jan. 19, 2010

(54) SEAMLESS SPLIT-HORIZON FLOODING OF LAYER TWO (L2) NETWORK TRAFFIC ON NON-NATIVE AND MIXED ARCHITECTURES

(75) Inventors: Kaushik Ghosh, Sunnyvale, CA (US); Kireeti Kompella, Los Altos, CA (US); Junan Chen, San Jose, CA (US); Raj Tuplur, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 168 days.

(21) Appl. No.: 12/034,299

(22) Filed: Feb. 20, 2008

(51) Int. Cl.
*H04L 12/54* (2006.01)
(52) U.S. Cl. ..................................................... 370/428
(58) Field of Classification Search .................. 370/338, 370/254, 400, 401, 356, 395, 237, 229, 235, 370/236, 390, 392, 389, 406, 218, 348; 709/239, 709/223, 238; 455/41
See application file for complete search history.

(56) References Cited

U.S. PATENT DOCUMENTS

| | | | |
|---|---|---|---|
| 6,535,507 B1 * | 3/2003 | Li et al. ...................... | 370/356 |
| 7,027,773 B1 * | 4/2006 | McMillin ................... | 455/41.2 |
| 2002/0176363 A1 * | 11/2002 | Durinovic-Johri et al. .. | 370/237 |
| 2003/0026268 A1 * | 2/2003 | Navas ......................... | 370/400 |
| 2004/0114595 A1 * | 6/2004 | Doukai ........................ | 370/389 |
| 2004/0174825 A1 * | 9/2004 | Li et al. ...................... | 370/254 |
| 2005/0226201 A1 * | 10/2005 | McMillin .................... | 370/348 |
| 2006/0235995 A1 * | 10/2006 | Bhatia et al. ................ | 709/238 |
| 2007/0206492 A1 * | 9/2007 | Zelig et al. .................. | 370/218 |
| 2008/0137660 A1 * | 6/2008 | Olakangil et al. ........... | 370/392 |
| 2008/0198865 A1 * | 8/2008 | Rudnick et al. ............. | 370/406 |

* cited by examiner

*Primary Examiner*—Hong Cho
*Assistant Examiner*—Prenell P Jones
(74) *Attorney, Agent, or Firm*—Shumaker & Sieffert, P.A.

(57) ABSTRACT

A forwarding component of a routing node floods copies of a packet to a plurality of next hops associated with the same layer two (L2) network as an interface on which the packet was received. The plurality of next hops excludes a next hop that corresponds to the interface that received the packet. The forwarding component requires that forwarding information installed by a control unit specify the plurality of next hops to which to flood the copies of the packet, and the forwarding component is not capable of deriving the plurality of next hops to which to flood the copies of the packet from a single flooding next hop identifier after the packet is received. Prior to receiving the packet, a flooding next hop control module derives the plurality of next hops based on the flooding next hop and installs the derived next hops into the forwarding information.

17 Claims, 6 Drawing Sheets

SEAMLESS SPLIT-HORIZON FLOODING OF LAYER TWO (L2) NETWORK TRAFFIC ON NON-NATIVE AND MIXED ARCHITECTURES

TECHNICAL FIELD

The invention relates to packet-based computer networks and, more particularly, to forwarding packets within computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a data link layer device is a customer premises equipment (CPE) device, such as a switch, modem, Ethernet card, or wireless access point. Traditional L2 networks include Ethernet networks, Asynchronous Transfer Mode (ATM) networks, Frame Relay networks, networks using High Level Data Link Control (HDLC), Point-to-Point (PPP) connections, PPP sessions from Layer 2 Tunneling Protocol (L2TP) tunnels, and Virtual Local Area Networks (VLANs).

In some instances, a layer three (L3) network is used as an intermediate transport network between two or more L2 networks in order to allow communication between the L2 networks. In this type of configuration, the L3 network transparently transports L2 communication between the L2 networks, thereby allowing the L2 networks to share an L2 service. Common protocols for transporting the L2 service through the intermediate L3 network are label switching protocols, such as Multi-protocol Label Switching (MPLS) protocols like Resource Reservation Protocol (RSVP) and the Label Distribution Protocol (LDP). In accordance with MPLS, a source device, such as a router connected to one of the L2 networks, can request a path through the intermediate network. This path, referred to as a Label Switched Path (LSP), defines one or more distinct, dedicated, and guaranteed paths through the network to carry MPLS packets from the source to the destination. The MPLS packets encapsulate the L2 communications, thereby effectively shielding the L3 network from the transported L2 information.

One example of an L2 service is the Virtual Private LAN Service (VPLS) that simulates a local area network. In general, VPLS allows two or more remote customer networks to be extended through the intermediate network as if the intermediate network does not exist. In particular, L2 communications, such as Ethernet packets, are transported between customer networks via the intermediate network. In a typical configuration, VPLS-enabled routers that are associated with the customer networks define LSPs within the intermediate network to carry encapsulated L2 communications as if these customer networks were directly attached to the same LAN. To properly communicate via these LSPs, each of these VPLS-enabled routers store L2 information, such as Media Access Control (MAC) addresses, as well as VPLS information, such as local and remote VPLS site information. In this manner, these VPLS-enabled routers provide transparent L2 connectivity across the intermediate network and simulate a direct LAN.

In L2 networks, an L2 device responsible for forwarding network traffic, such as an L2 switch or an VPLS-enabled router, operates to "flood" (i.e., forward a copy) network traffic to a set of output ports of the device in a situation where the network traffic is destined for a network address that has not previously been seen, and therefore not learned, by the device. In this manner the L2 device can ensure that at least the destination receives the network traffic regardless of the destination's location within the L2 network. The L2 device continues to flood to the set of output ports all subsequent network traffic bound for the destination address until the L2 device receives some network traffic originated from the address, at which time the L2 device is able to "learn" the specific port by which the L2 address is reachable. As a result, the L2 device forwards future network traffic bound for the address to the particular output port and no longer needs to flood the network traffic.

In this way, L2 network devices rely on network traffic flooding to ensure that L2 traffic reach their destinations. However, the use of network flooding requires that the L2 devices operate to reduce or eliminate any "data loops" in the L2 network, i.e., situations where network traffic is flooded in a manner that results in the flooding device subsequently receiving the same traffic it flooded. The presence of such a data loop may have severe adverse affects on a L2 network. For example, a data loop may result in consumption of significant bandwidth and resources as the flooded traffic within the data loop is continuously flooded by the devices. Moreover, a data loop may also result in the final destination receiving multiple copies of the same packet.

Thus, it is often necessary to eliminate data loops from the L2 network topology. As a result, many L2 switches or VPLS-enabled routers often attempt to operate in accordance with a rule known as the "split-horizon rule" to avoid data loops. The split-horizon rule prohibits a router flooding a copy of an L2 packet back out an interface from which the original L2 packet was received.

SUMMARY

In general, techniques are described by which a network device, such as an L2 switch or an L2-enabled router, forwards network traffic in accordance with the split-horizon rule. More specifically, as described herein, a network device may achieve split-horizon flooding by utilizing the logical construct of a single "flooding next hop" to logically represent all of the corresponding next hops (i.e., neighboring L2 nodes adjacent the network device) in the L2 network to which to flood certain network traffic. For example, when maintaining network topology and forwarding information, high-level control plane software of an L2-enabled router (e.g., a VPLS-enabled router) may utilize a single flooding next hop identifier (e.g., 'FNH1') to represent all of the L2 devices to which to flood certain traffic without regard to the specific, individual next hops in the L2 network. This allows high-level control plane software executing on within the L2-enabled router (such as L2/L3 routing protocols) to more easily maintain network topology information and forwarding information without being concerned with specifics of the split-horizon rule. That is, the high-level control plane software need not be responsible for ensuring compliance with the split-horizon rule when maintaining topology information and other routing information for the L2 network.

To flood L2 network traffic, lower-level components of the L2-enabled device derives 'split horizon flooding next hops' from the flooding next hop identifiers on behalf of the high-level, control plane software. For example, an L2-enabled router first performs flood list expansion to logically expand the flooding next hop identifiers maintained by the high-level control plane software into the complete list of next hops within the L2 network. For example, on behalf of the high-level control plane software executing on within the VPLS-enabled router the L2-enabled router may expand a flooding next hop FNH1 to the set of packet forwarding next hops {NH1, NH2, NH3 and NH4} representing four neighboring L2 devices. Next, the lower-level components of the L2-enabled router further processes the expanded list to exclude the next hop associated with the ingress port in order to ensure compliance with split-horizon flooding. Continuing the example from above, assuming the flooding next hop identifier FNH1 is used in association with L2 packets received on a first interface, the lower-level components produce forwarding information that replaces the flooding next hop identifier FNH1 with the set of specific next hops {NH2, NH3, NH4} to the exclusion of the next hop associated with the ingress interface (NH1 in this example).

As described herein, in some configurations flood list expansion and split-horizon rule implementation may be off-loaded to a packet forwarding engine of the L2-enabled router and performed at the time the L2 packet is being forwarded. That is, some embodiments of packet forwarding described herein incorporate forwarding hardware (i.e., chipsets) capable of natively processing flooding next hop identifiers 'on-the-fly' (i.e., when forwarding traffic) to derive the specific next hops to which to flood traffic. For example, when flooding traffic, an egress interface card or other hardware component of the packet forwarding engine processes the flooding next hop identifier specified in the forwarding information and then compares the egress port to which the flooding packet is being sent with the ingress port by which the original L2 packet was received. The L2-enabled router automatically drops the flooding packet if the egress port is identical to the ingress port. As described herein, an advanced chipset incorporated within the egress interface card of packet forwarding engine may have such capability built-in (i.e., "native") and is referred to herein as a "second-generation chipset."

In other configurations, some or all of the packet forwarding engines or other hardware components of the L2-enabled device may be based on "first-generation chipsets" that lack the capability required for such flood list expansion and an on-the-fly comparison for purposes of split-horizon forwarding. Flood list expansion capabilities are referred to as "non-native" with respect to such chipsets. In this case, the packet forwarding engine is configured with forwarding information mapping an ingress port to a specific plurality of next hops in the L2 network to which to flood the network packet. In this manner, the forwarding information installed within the packet forwarding engine is generated to specify all next hops to which to flood network traffic and specifically excludes the next hop associated with the ingress port in order to perform split-horizon flooding.

As described herein, generation of the forwarding information in this form is accomplished without modification to the high-level control plane software. That is, the high-level control plane software nevertheless utilizes the logical construct of a flooding next hop to represent all of the corresponding next hops (i.e., neighboring L2 nodes adjacent the network device) in the L2 network associated with the traffic being forwarded. Moreover, a component operative below the high-level control plane software yet above the packet forwarding engine is utilized to perform flood list expansion as well as generation and installation of forwarding information in the necessary format to specify all individual next hops to which to flood network traffic and to specifically exclude the next hop associated with the ingress interface port. As a result, the high-level control plane software executing on within the L2-enabled router (such as L2/L3 routing protocols) still need not be concerned with specifics of the split-horizon rule when maintaining topology information and other routing information for the L2 network.

For example, in accordance with the principles of the invention, high-level control plane software executing (e.g., a routing process such as a VPLS control plane software process) running on a control unit of the L2-enabled device maintains network topology information (e.g., routing information) and produces forwarding information in a form that utilizes the flooding next hop identifiers to logically represent the next hops to which to flood particular L2 traffic. In the case of a routing device having multiple packet forwarding engines, the control unit may process the routing information and generate forwarding information for each of the plurality of forwarding components.

In one embodiment, a flooding next hop control module operating within a lower-level of the control unit (e.g., within an operating system of the control unit) may be seamlessly invoked when the forwarding information is generated to perform flood list expansion and to derive for each flooding next hop the corresponding 'split-horizon flooding next hops,' i.e., the list of the specific unicast next hops within the L2 network to which to flood the copies of the original packet to the exclusion of the next hop associated with the ingress interface. Prior to communication to the packet forwarding engine, the flooding next hop control module then installs the derived split horizon next hops into the forwarding information (e.g., by replacing each of the flooding next hops with the corresponding derived split horizon next hop).

The flooding next hop control module may determine a next hop that corresponds to each interface of a forwarding component based on a one-to-one relationship between the interfaces and the unicast next hops. The flooding next hop control module derives the split-horizon flooding next hops for each interface by removing the next hop that corresponds to the ingress interface from a set of all next hops associated with the forwarding component for a particular L2 network. The remaining set of next hops comprises the split-horizon flooding next hop for the particular interface, and specifies the plurality of next hops to which to flood copies of a received packet. The flooding next hop control module updates the forwarding information within the control unit to map each of the interfaces to the respective derived split-horizon flooding next hop. A copy of the forwarding information is then installed within the forwarding component, i.e., the packet forwarding engine.

In another embodiment, each forwarding component of the L2-enabled device is configured with a 'slave' flooding next hop control module to internally derive split-horizon flooding next hops for the forwarding component based on next hop information provided by the 'master' flooding next hop control module of the control unit. In this embodiment, the 'slave' flooding next hop control modules of the forwarding components may follow a similar method for deriving the split-horizon flooding next hops using the one-to-one correspondence between the interfaces and next hops to remove the next hop that corresponds to the ingress interface from a set of all next hops within the L2 network.

In some situations, an L2-enabled device may combine both forwarding components that incorporate first-generation chipsets with forwarding components that incorporate second-generation chipsets. That is, the L2-enabled device may include a first subset of forwarding components having first-generation chipsets that, as described above, lack the capability required for such flood list expansion and derivation of on-the-fly comparison for purposes of split-horizon forwarding and, therefore, require that the forwarding information installed by the control unit specify the plurality of next hops to which to flood copies of the packet. A second subset of forwarding components, perhaps newer forwarding components, installed within the L2-enabled device may incorporate second-generation chipsets that are capable of deriving the plurality of next hops to which to flood the copies of the packet on-the-fly. For example, the second subset of forwarding components may on-the-fly (i.e., after receiving the inbound packet and prior to flooding the packet): identify the interface from which a packet ingressed, perform flood list expansion of the flooding next hop in the forwarding information and remove the next hop associated with the ingress interface to produce a specific list of next hops to which the packet is to be flooded, and flood copies of the original packet to interfaces associated with those next hops. Thus, different forwarding component chipsets within a single L2 device may apply different techniques for split-horizon flooding. Such an L2-enabled device may be referred to as having a "mixed" architecture. Nevertheless, the techniques described herein allow high-level, control plane software executing on within the L2-enabled router (such as L2/L3 routing protocols) to utilize flooding next hops and need not be responsible for ensuring compliance with the split-horizon rule when maintaining topology information and other routing information for the L2 network.

As one example, the flooding next hop control module executing with the kernel of the control plane may be configured with data specifying the different types of forwarding components installed within the L2 device. Based on this information, the flooding next hop control module provides different information to the forwarding components depending on the chipset type. This allows each of the forwarding components to obtain split-horizon flooding next hops according to its own functionality for use in packet forwarding. The forwarding components may obtain common next hop indices by upcalls to the kernel. In this manner, application layer protocols and other high-level control plane software executing within the control unit of the L2 device need not be burdened with the different flooding techniques being used at the packet forwarding level. In other words, the high-level control plane software "sees" the same abstraction regardless of how the split-horizon rule is followed within the forwarding components. This consistency of presentation to the high-level control plane software may be easier to program to, and may also allow for better control plane scaling.

The techniques may provide one or more advantages. For example, the techniques allow for placing forwarding components with varying split-horizon flooding functionality in the same L2 device (such as a multi-chassis, VPLS-enabled routing node), even when control plane software (e.g., routing process) executing at an application layer of the control unit of the L2 device maintains routing information in a form that utilizes the flooding next hop construct and relies on the underlying components for flooding list expansion and derivation. This may allow for use of older forwarding plane chipsets and newer, more advanced chipsets in a routing node in a plug-and-play manner and/or in combination.

In one embodiment, a routing node comprises an interface that receives a packet from a network, a forwarding component, and a control unit that installs forwarding information within the forwarding component. Based on stored forwarding information, the forwarding component floods copies of the packet to a plurality of next hops associated with a same layer two (L2) network as the interface on which the packet was received, wherein the plurality of next hops excludes a next hop that corresponds to the interface on which the packet was received. The forwarding component requires that the forwarding information installed by the control unit specify the plurality of next hops to which to flood the copies of the packet and is not capable of deriving the plurality of next hops to which to flood the copies of the packet from a single flooding next hop identifier after the packet is received from the network. A routing process executing at an application layer of the control unit maintains routing information in accordance with routes through a network in a form that specifies the flooding next hop identifier for the L2 network. Prior to receiving the packet, a flooding next hop control module automatically derives the plurality of next hops to which to flood the copies of the packet based on the flooding next hop identifier of the routing information maintained by the routing process and installs the derived plurality of next hops into the forwarding information.

In another embodiment, a method comprises maintaining routing information in accordance with routes through a network in a form that specifies a flooding next hop identifier, automatically deriving a plurality of next hops to which to flood copies of a packet received from the network based on the flooding next hop identifier of the routing information, and installing the derived plurality of next hops into forwarding information, receiving a packet from the network via an interface. The method further comprises, in accordance with the forwarding information, flooding copies of the packet with a forwarding component to a plurality of next hops associated with a same layer two (L2) network as the interface on which the packet was received, wherein the plurality of next hops excludes a next hop that corresponds to the interface on which the packet was received. The forwarding component requires that the forwarding information specify the plurality of next hops to which to flood the copies of the packet and wherein the forwarding component is not capable of deriving the plurality of next hops to which to flood the copies of the packet from the single flooding next hop identifier.

In another embodiment, a computer-readable medium containing instructions. The instructions cause a programmable processor to maintain routing information in accordance with routes through a network in a form that specifies a flooding next hop identifier, automatically derive a plurality of next hops to which to flood copies of a packet received from the network based on the flooding next hop identifier of the routing information, and install the derived plurality of next hops into forwarding information. The instructions further cause the programmable processor to receive a packet from the network via an interface, in accordance with the forwarding information, to flood copies of the packet with a forwarding component to a plurality of next hops associated with a same layer two (L2) network as the interface on which the packet was received. The plurality of next hops excludes a next hop that corresponds to the interface on which the packet was received. The forwarding component requires that the forwarding information specify the plurality of next hops to which to flood the copies of the packet and wherein the forwarding component is not capable of deriving the plurality of next hops to which to flood the copies of the packet from the single flooding next hop identifier.

The details of one or more embodiments of the invention are set forth in the accompanying drawings and the descrip-

DETAILED DESCRIPTION

Figure 1:
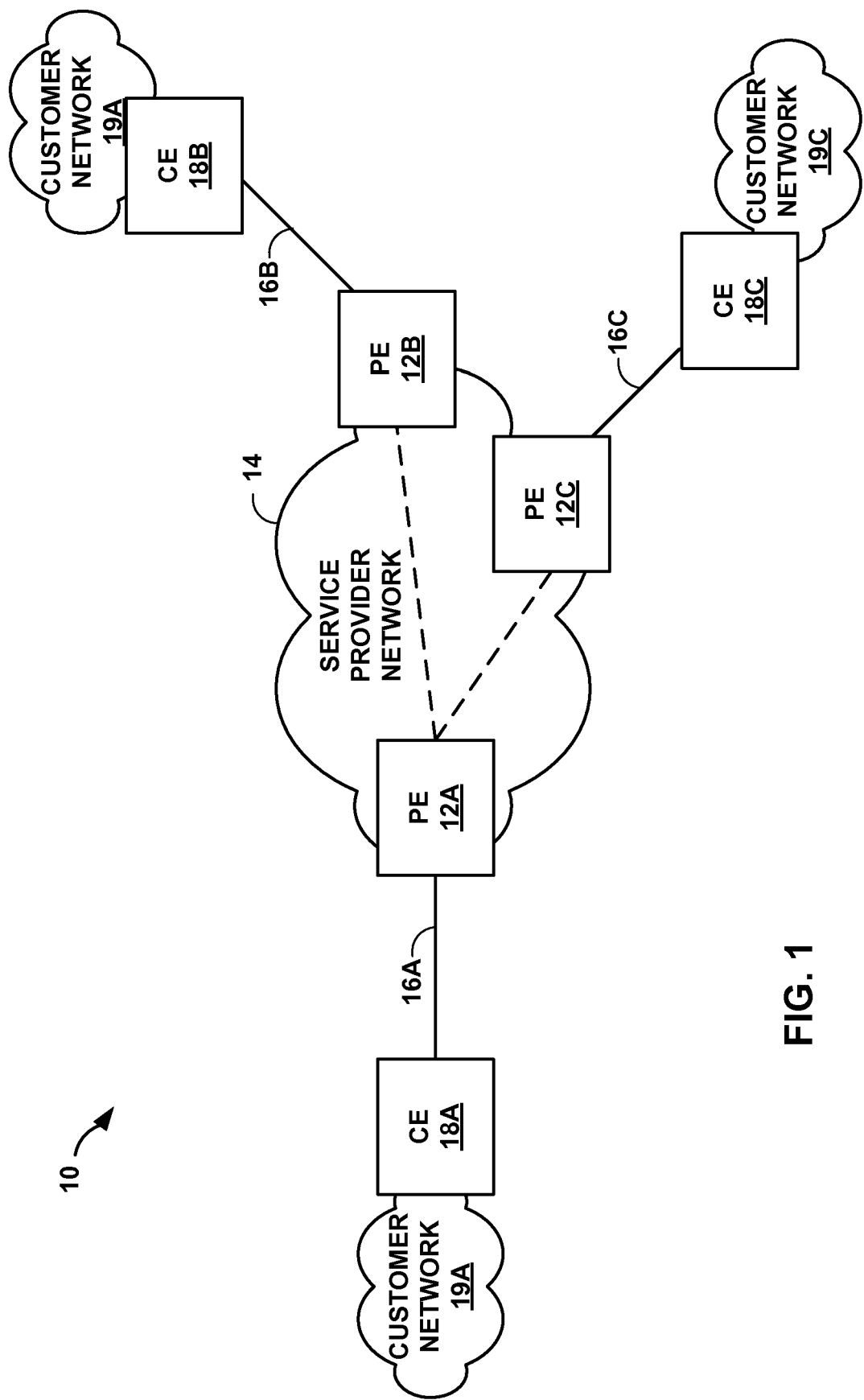
FIG. 1 is a block diagram illustrating an example system in which a provider edge router of a service provider network employs split-horizon flooding techniques in accordance with the principles of the invention.

FIG. 1 is a block diagram illustrating an example system 10 in which a provider edge (PE) router 12A of service provider network 14 employs split-horizon flooding techniques in accordance with the principles of the invention. In the illustrated example of FIG. 1, PE routers 12A-12C ("PE routers 12") are provider edge routers of a service provider network 14 administered by a network service provider, and provide connectivity for customer networks 19A-19C ("customer networks 19"). In particular, PE routers 12 are coupled to customer edge (CE) routers 18A-18C ("CE routers 18") of customer networks 19 via access links 16A-16C, respectively. PE routers 12 communicate with CE routers 18 to provide customer networks 19 with access to service provider network 14.

As shown, each of customer networks 19 may be a network for a site of an enterprise. Each of customer networks 19 may include one or more computing devices (not shown), such as personal computers, laptop computers, handheld computers, workstations, servers, switches, printers, or other devices. Service provider network 14 may be coupled to one or more networks administered by other service providers, and may thus form part of a large-scale public network infrastructure, e.g., the Internet. Consequently, customer networks 19 may be viewed as edge networks of the Internet. The service provider may provide computing devices within customer networks 19 with access to the Internet via service provider network 14, which allows computing devices within one of customer networks 19 to communicate with computing devices within the Internet or the other one of customer networks 19. Service provider network 14 may include a variety of other network devices (not shown), such as routers, switches, servers, and the like and may be connected to other networks.

The configuration of the network environment illustrated in FIG. 1 is merely exemplary. For example, service provider network 14 may include any number of provider edge routers coupled to one or more customer networks. Nonetheless, for ease of description, only customer networks 19A-19C are illustrated in FIG. 1.

In one embodiment, network 10 comprises a virtual private local area network service (VPLS) domain used to extend remote customer networks 19, i.e., VPLS sites, through intermediate service provider network 14 and possibly other intermediate networks, such as the Internet, as if the intermediate networks do not exist. VPLS domains provide point-to-multipoint (P2MP) connectivity, and may transport layer two (L2) communications, such as Ethernet packets, between customer networks 19 via service provider network 14 in a P2MP fashion. CE routers 18 as well as PE routers 12 execute the VPLS protocol and, in this manner, are VPLS-enabled routers. In a typical configuration, CE routers 18 coupled to the customer networks 19 define a full mesh of P2MP label switched paths (LSPs) within the service provider network 14 to carry encapsulated L2 communications as if customer networks 19 were directly attached to the same local area network (LAN).

As described herein, L2 devices within network 10 that operate within the VPLS domain apply the split-horizon rule to avoid data loops in the forwarding plane. As one example, PE routers 12 are described as achieving split-horizon flooding by utilizing the logical construct of "flooding next hop" identifiers to logically represent the corresponding next hops (i.e., neighboring L2 nodes adjacent the network device) in the L2 network to which to flood network traffic. More specifically, when maintaining network topology and forwarding information, high-level control plane software (e.g., the VPLS protocol) executing on each PE router 12 utilize individual flooding next hop identifiers (e.g., 'FNH1') when generating forwarding information, where each flooding next hop identifier logically represents all of the L2 devices to which to flood certain traffic without regard to the specific, individual next hops in the L2 network. This allows high-level control plane software executing within PE routers 12 (such as L2/L3 routing protocols) to more easily maintain network topology information and forwarding information without being concerned with specifics of the split-horizon rule. That is, the high-level control plane software need not be responsible for ensuring compliance with the split-horizon rule when maintaining topology information and other routing information for the L2 network.

As described herein, in some configurations flood list expansion and split-horizon rule implementation may be offloaded to packet forwarding engines of the VPLS-enabled routers PE 12 and performed at the time L2 VPLS packets are being forwarded. That is, some embodiments some or all of PE routers 12 may incorporate packet forwarding engines that include forwarding hardware (i.e., chipsets) capable of processing forwarding information having flooding next hop identifiers 'on-the-fly' (i.e., when forwarding traffic) to derive the specific next hops to which to flood traffic. For example, when flooding traffic, an egress interface card or other hardware component of the packet forwarding engine processes the flooding next hop identifier specified in the forwarding information and then compares the egress port to which the flooding packet is being sent with the ingress port by which the original L2 packet was received. The hardware component then automatically drops the flooding packet if the egress port is identical to the ingress port. In other words, the hardware component does not flood a copy of the packet out the port that corresponds to the ingress port. As described herein, an advanced chipset incorporated within the egress interface card of packet forwarding engine may have such capability built-in and is referred to herein as a "second-generation chipset."

In other configurations, some or all of PE routers 12 may have one or more packet forwarding engines or other hardware components that are based on "first-generation chipsets" that lack the capability required for such dynamic flood list expansion and an on-the-fly comparison for purposes of split-horizon compliance. In this case, the packet forwarding engine does not support (i.e., natively recognize) flooding next hop identifiers and must be configured with forwarding information that maps an ingress port to a specific plurality of next hops in the L2 network 10 to which to flood the network packet. In this manner, the forwarding information installed within the packet forwarding engine must be generated to specify all next hops to which to flood network traffic and specifically excludes the next hop associated with the ingress port in order to perform split-horizon flooding.

In this case, any of PE routers 12 having forwarding hardware based on "first-generation chipsets" is configured with a lower-level component referred to herein as a flooding next hop control module. The flooding next hop control module operates at a lower-level of the control plane for each of PE routers 12 and derives the 'split horizon flooding next hops' from the flooding next hop identifiers on behalf of the high-level, control plane software. For example, the lower-level flooding next hop control module of PE router 12A derives the particular next hops by first performing flood list expansion to logically expand the flooding next hop identifiers maintained by the high-level control plane software into the complete list of next hops within the L2 network. For example, with respect to forwarding information for inbound traffic received from CE 18A, the flooding next hop control module may expand a flooding next hop identifier FNH1 to the set of actual next hops {NH1, NH2, and NH3} representing neighboring devices CE 18A, PE 12B and PE 12C. Next, the lower-level components of PE router 12A further processes the expanded list to exclude the NH1 associated with the ingress port for traffic received from CE 18A in order to ensure compliance with split-horizon flooding.

Continuing the example from above, assuming the flooding next hop identifier FNH1 is used in association with L2 packets received from CE router 18A on an interface associated with NH1, the lower-level flooding next hop control module modifies the forwarding information produced by the upper-level, control plane software to replace the flooding next hop identifier FNH1 within the forwarding information with a set of specific next hops {NH2 and NH3} to the exclusion of the next hop associated with the ingress interface (NH1 in this example). Alternatively, the flooding next hop control module may modify the forwarding information to replace to replace the flooding next hop identifier FNH1 within the forwarding information with a different identifier, i.e., a split-horizon flooding next hop identifier, that indexes data specifying the set of specific next hops {NH2 and NH3}.

As described in further detail below, a one-to-one relationship may exist between the interfaces and the elemental unicast next hops, even in the case that the L2 router includes a plurality of packet forwarding engines, and the lower-level components responsible for derivation of the split-horizon flooding next hops map the interfaces to next hops according to an index. Based on this information, the lower-level flooding next hop control module may derive split-horizon flooding next hops to which to forward traffic for each interface associated with a given packet forwarding component of the device. For example, the lower-level flooding next hop control module may determine which next hop corresponds to each interface based on this one-to-one relationship. The flooding next hop control module then derives the complete list of split-horizon flooding next hops for each ingress interface by removing the next hop that corresponds to that ingress interface from a set of all next hops associated with the L2 domain 10.

For example, if interfaces $I_1$, $I_2$, and $I_3$ of PE router 12A correspond to next hops CE 18A, PE 12B, and PE 12C, respectively, the end result of the derived split-horizon flooding next hops may be the following routes:

$$\begin{cases} I_1 \to FNH_1 \to \{PE12B, PE12C\} \\ I_2 \to FNH_2 \to \{CE18A, PE12C\}, \\ I_3 \to FNH_3 \to \{CE18A, PE12B\} \end{cases}$$

where $FNH_1$-$FNH_3$ are flooding next hop identifiers used in forwarding information in association with ingress interfaces based on an index, and where each derived set { ... } contains the list of specific next hops to which to flood traffic from received on that interface.

The lower-level flooding next hop control module of each PE12 selectively updates the forwarding information to map each of the interfaces to the respective derived split-horizon flooding next hops, and the updated the forwarding information is then installed within the appropriate packet forwarding engine.

Although the techniques of the invention have been primarily described with respect to provider edge devices running VPLS, embodiments of the invention are not limited in this regard. Other network devices, such as routers within the core of a network or customer edge routers 18, may perform the functions described herein. In addition, other network protocols that make use of split-horizon flooding, e.g., network protocols for establishing a virtual local area network (VLAN) and forwarding traffic therein may employ the techniques described herein. Moreover, the devices may be applied by any L2 switch or other device operative to comply with the split-horizon rule.

Figure 2:
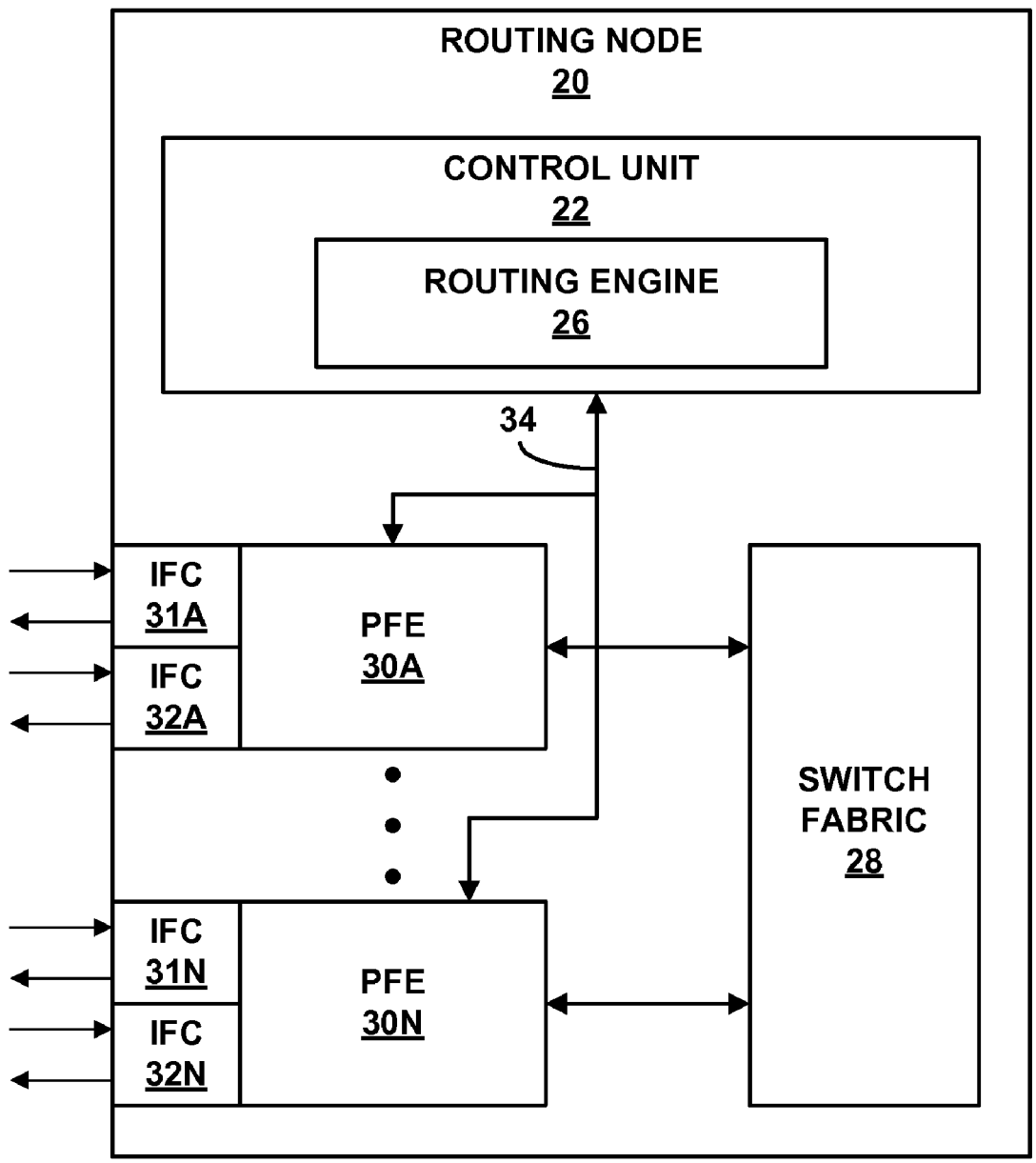
FIG. 2 is a block diagram illustrating an example routing node that may create split-horizon flooding next hops in accordance with the principles of the invention.

FIG. 2 is a block diagram illustrating an example routing node 20 that utilizes flooding next hop identifiers and derives split-horizon flooding next hops in accordance with the principles described herein. Routing node 20 may comprise a router such as one of PE routers 12 or CE routers 18 of FIG. 1, a core router, or other network device. In this example, routing node 20 includes a control unit 22 that includes a routing engine 26 that provides control plane functionality for the device. Routing node 20 also includes a plurality of packet forwarding engines 30A-30N ("PFEs 30") and a switch fabric 28 that collectively provide a data plane for forwarding network traffic. PFEs 30 receive and send data packets via interface cards 31A-31N ("IFCs 31") and IFCs 32A-32N ("IFCs 32"). In other embodiments, each of PFEs 30 may comprise more or fewer IFCs. Switch fabric 28 provides a high-speed interconnect for forwarding incoming data packets to the correct one of PFEs 30 for transmission over a network.

Routing engine 26 provides control plane functions storing network topology in the form of routing tables, executing routing protocols to communicate with peer routing devices and maintain and update the routing tables, and providing a management interface to allow user access and configuration of routing node 20.

Routing engine 26 is connected to each of PFEs 30 by a dedicated internal communication link 34. For example, dedicated link 34 may comprise a 200 Mbps Ethernet connection. Routing engine 26 maintains routing information that describes a topology of a network, and derives a forwarding information base (FIB) in accordance with the routing information. In general, the routing information represents the overall topology of the network and defines routes to destinations/prefixes within the network. In contrast, the forwarding information is generated based on selection of certain routes within the network and maps packet key information (e.g., destination information and other select information from a packet header) to one or more specific next hops and ultimately to one or more specific output interfaces of IFCs 31, 32. Routing engine 26 installs a FIB into each of PFEs 30 to control forwarding of traffic within the data plane. This allows the FIB in each of PFEs 30 to be updated without degrading packet forwarding performance of routing node 20. In some instances, routing engine 26 may drive separate FIBs which are copied to respective PFEs 30.

Based on the stored FIBs, PFEs 30 flood copies of each received L2 packet to a plurality of next hops associated with the same layer two (L2) network as the interface on which the packet was received, wherein the plurality of next hops excludes a next hop that corresponds to the interface that received the packet (i.e., conforms to the split-horizon rule).

Routing node 20 may have one or more packet forwarding engines 30 or other hardware components that lack the capability required for dynamic flood list expansion and an on-the-fly comparison for purposes of split-horizon compliance. In this case, the packet forwarding engine does not support (i.e., recognize) flooding next hop identifiers and must be configured by control unit 22 with forwarding information that maps an ingress port to a specific plurality of next hops in the L2 network 10 to which to flood the network packet. For example, PFE 30A may comprise a first generation chipset that requires that the FIB installed by control unit 22 specify a plurality of next hops to which to flood copies of received packets, and is not capable of deriving the plurality of next hops to which to flood the copies of the packet from a single flooding next hop identifier.

Nevertheless, the high-level control plane software executing within routing engine 26 utilizes the logical construct of a flooding next hop identifier when generating the FIB. A flooding next hop control module operative below the high-level control plane software performs flood list expansion as well as generation and installation of forwarding information in the necessary format to specify all individual next hops to which to flood network traffic and to specifically exclude the next hop associated with the ingress interface port. As a result, the high-level control plane software executing on within routing engine 26 (such as L2/L3 routing protocols) need not be concerned with specifics of the split-horizon rule when maintaining topology information and forwarding information for the L2 network. In other words, the high-level control plane software "sees" a seamless abstraction regardless of how the split-horizon rule is followed within the forwarding components. The techniques may allow for better scaling when interfaces fail, join, or leave the VPLS domain.

A one-to-one relationship may exist between the interfaces of IFCs 31, 32 and the elemental unicast next hops within the L2 network, and the flooding next hop control module responsible for derivation of the split-horizon flooding next hops maps the interfaces to next hops according to an index. The lower-level flooding next hop control module determines which next hop corresponds to each interface based on this one-to-one relationship. The flooding next hop control module then derives the complete list of split-horizon flooding next hops for each ingress interface by removing the next hop that corresponds to that ingress interface from a set of all next hops associated with the L2 domain. The lower-level flooding next hop control module of routing engine 26 selectively updates the forwarding information to map each of the interfaces to the respective derived split-horizon flooding next hops, and the updated forwarding information is then installed within the appropriate packet forwarding engine 30.

In another embodiment, each PFEs 30 of the L2-enabled device is configured with a 'slave' flooding next hop control module to internally derive split-horizon flooding next hops based on next hop information provided by the 'master' flooding next hop control module executing with control unit 22. In this embodiment, the 'slave' flooding next hop control modules of the forwarding components may follow a similar method for deriving the split-horizon flooding next hops using the one-to-one correspondence between the interfaces and next hops to remove the next hop that corresponds to the ingress interface from a set of all next hops within the L2 network.

Subsequently, routing node 20 may receive L2 VPLS traffic on an interface destined to a destination address that routing node 20 has not yet learned. Upon receiving the L2 VPLS traffic, PFE 30A references its forwarding information base (FIB) (not shown) using the ingress interface as a key to obtain the list of split-horizon flooding next hops associated with the ingress interface. PFE 30A then floods the L2 VPLS traffic to the plurality of next hops associated specified by the forwarding information.

In other embodiments, PFEs 30 may have "mixed" architectures, in which a first subset of PFEs 30 may comprise first-generation chipsets, while a second subset of PFEs 30 may comprise second- or third-generation chipsets. The second- or third-generation chipsets may not require that the forwarding information installed by the control unit specify the plurality of next hops to which to flood copies of the packet. Rather, the second- or third-generation chipsets may be capable of deriving the plurality of next hops to which to flood the copies of the packet on-the-fly from a single flooding next hop that represents all of the next hops within the L2 network. For example, the second- or third-generation chipsets may identify the ingress interface of a packet, on-the-fly prior to flooding the packet, and remove the next hop associated with the interface from the set of next hops to which the packet is flooded.

In some cases, a packet may ingress on an interface of a first-generation PFE 30A, but may need to be flooded out of one or more interfaces on a second-generation PFE 30B as well as one or more interfaces on first-generation PFE 30A. When PFE 30A references its FIB to obtain the list of split-horizon flooding next hops for a packet received on the ingress interface, first-generation PFE 30A may initially do a first lookup and send the packet over the switch fabric 28 to all of PFEs 30 that might be involved in forwarding the packet, including itself. When the packet re-ingresses to first-generation PFE 30A from switch fabric 28, first-generation PFE 30A may do another lookup with the original ingress interface as the lookup key to find out which of the interfaces of first-generation PFE 30A on which to flood the original packet, resulting in the split-horizon flooding behavior for the packet.

Thus, different PFE chipsets within PE router 12A may apply different techniques for split-horizon flooding. The flooding next hop control module executing within routing engine 26 may be configured with data specifying the type of chipset for each of PFEs 30. As a result, the flooding next hop control module may provide forwarding information in different formats to the PFEs 30 depending on the chipset type. This allows each of PFEs 30 to obtain split-horizon flooding next hops according to its own functionality for use in packet forwarding. In this manner, application layer protocols (not shown) running within control unit 22 may be unaware of the different flooding techniques being used at the packet forwarding level. This allows high-level control plane software executing on within the L2-enabled routing node 20 (such as L2/L3 routing protocols) to utilize flooding next hop identifiers to more easily maintain network topology information and forwarding information without being concerned with specifics of the split-horizon rule. That is, the high-level control plane software executing within routing node 20 need not be responsible for ensuring compliance with the split-horizon rule when maintaining topology information and other routing information for the L2 network. With the same abstraction being seamlessly presented to the high-level control plane software in this manner, it may be easier to program the high-level control plane software with respect to this consistent abstraction. These techniques may allow for better scaling when interfaces fail, join, or leave the VPLS domain.

Figure 3A:
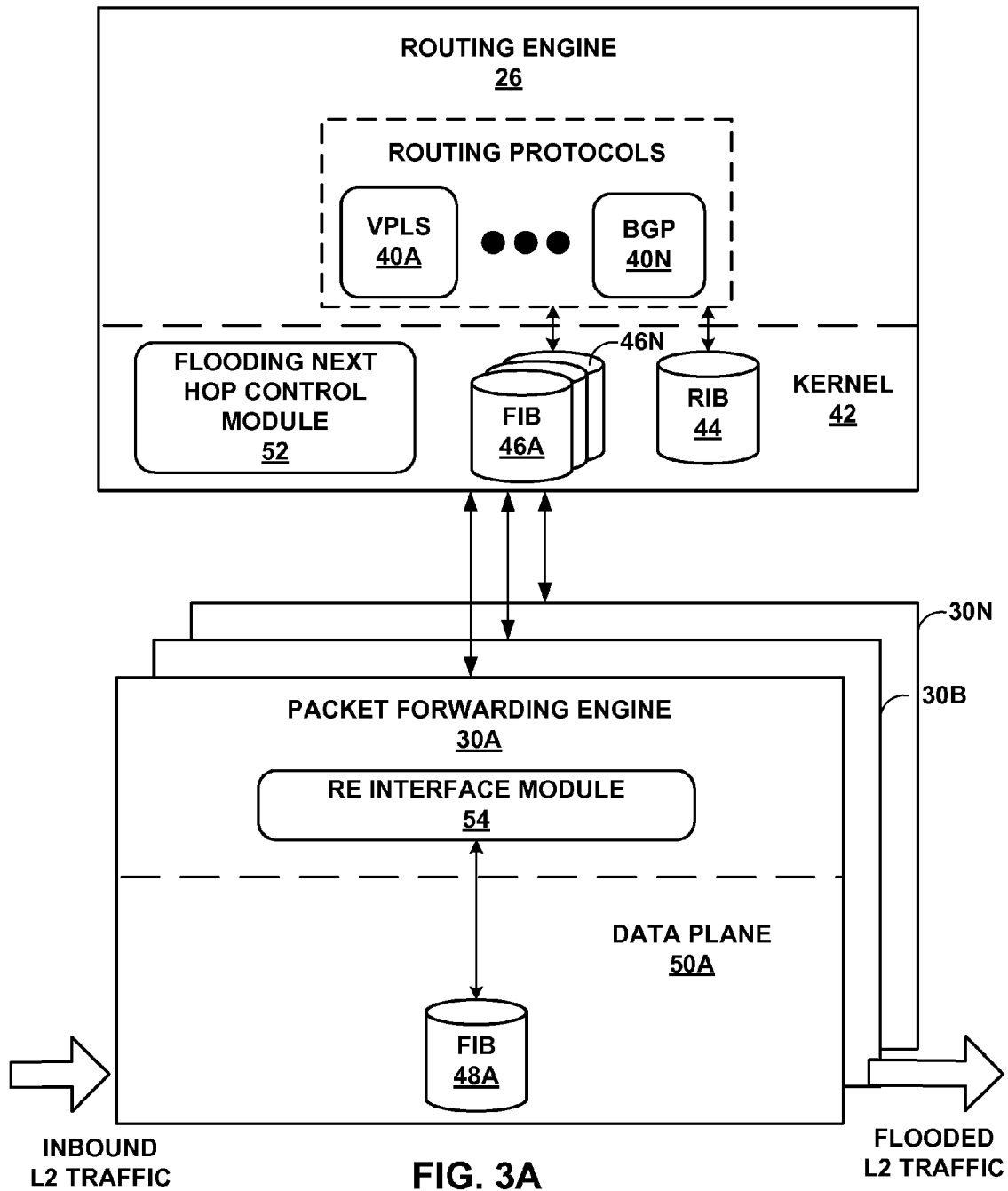
FIGS. 3A-3B are block diagrams illustrating a routing engine and a packet forwarding engine of the routing node of FIG. 2 in further detail.
Figure 3B:
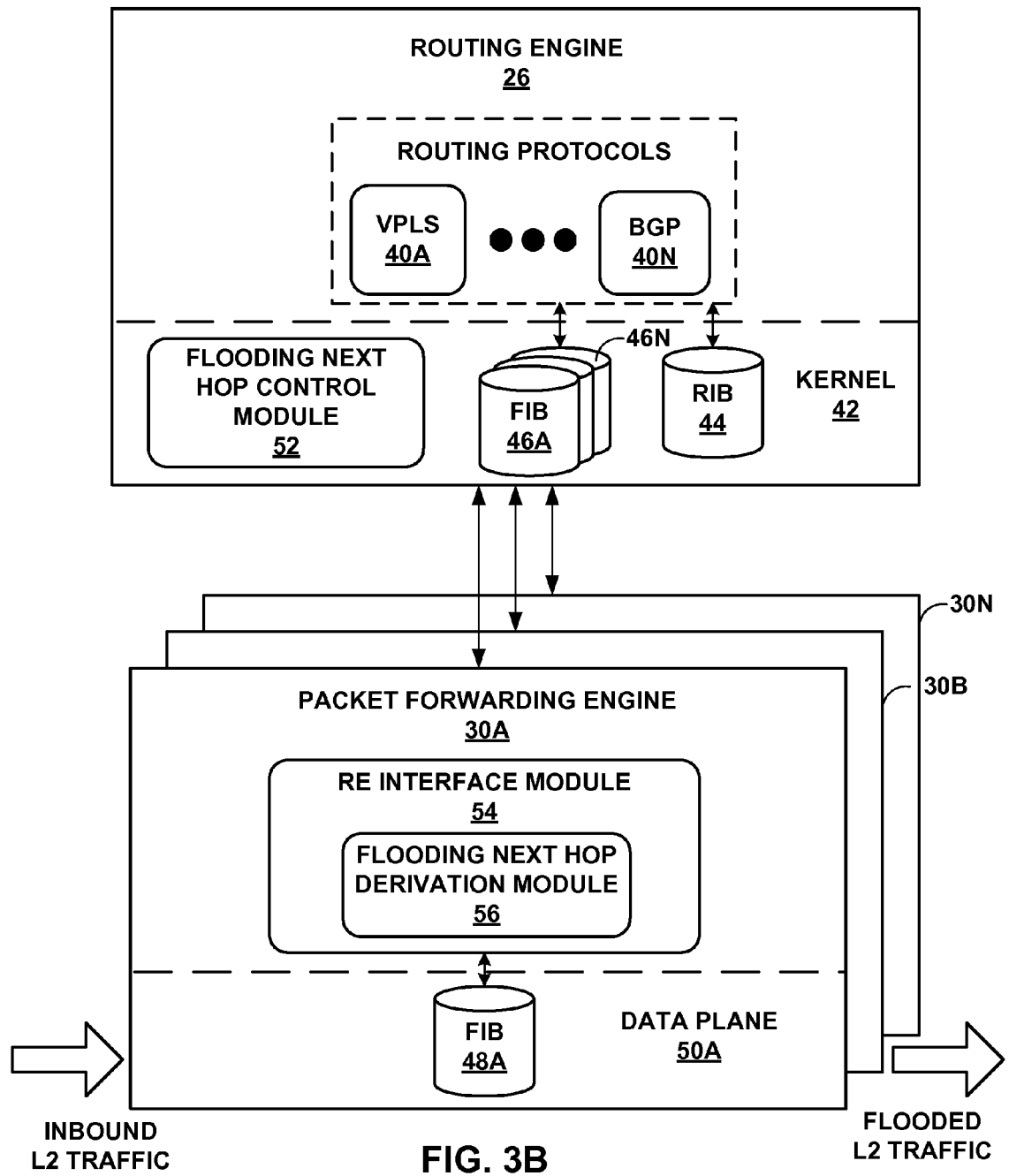

FIGS. 3A-3B are block diagrams illustrating routing engine 26 and packet forwarding engine 30A of routing node 10 of FIG. 2 in further detail. Routing engine 26 includes high-level, control plane routing protocols 40A-40N ("routing protocols 40"). In the example of FIGS. 3A and 3B, routing protocols 40 include VPLS 40A and BGP 40N. Routing engine 26 may include other routing protocols not shown in FIG. 2. Routing protocols 40 interact with kernel 42 to update routing information base (RIB) 44 based on routing protocol messages received by routing node 20. In response, kernel 42 generates forwarding information in the form of FIBs 46A-46N based on the network topology represented in RIB 44. Kernel 42 then programs PFEs 30 to install copies of the FIBs as FIBs 48A-48N within their respective data plane 50, i.e., packet forwarding components having specialized forwarding chipsets.

As described above, PFE 30A may comprise a first-generation chipset that requires that installed forwarding information specify the particular plurality of next hops to which to flood copies of received packets. That is, PFE 30A may not support use of flooding next hop identifiers and may not be capable of deriving the plurality of next hops to which to flood the copies of the packet on-the-fly from a single flooding next hop that represents all of the next hops within the L2 network. In this case, routing engine 26 programs PFE 30A to store FIB 48A. FIB 48A includes forwarding information describing interfaces and corresponding next hops to which packets received on the interfaces should be forwarded.

Although PFE 30A is not capable of deriving the plurality of next hops to which to flood the copies of the packet from a single flooding next hop that represents all of the next hops within the L2 network, the techniques of the invention nonetheless allow routing node 20 to set up split-horizon flooding next hops for PFE 30A based on the single flooding next hop. The split-horizon flooding next hops identify a set of next hops to which a packet should be flooded when the packet is received on a given interface and when the destination address of the packet is unknown to routing node 20, where the set of next hops conforms to the split-horizon rule (i.e., the set does not include the next hop corresponding to the ingress interface of the packet).

In one embodiment illustrated by FIG. 3A, the lower-level of control plane of routing engine 26 (i.e., flooding next hop control module 52) handles derivation of the split-horizon flooding next hops during derivation. That is, kernel 42 includes a flooding next hop control module 52 that is transparent to routing protocols 40 and other high-level, control plane software executing above kernel 42. After route resolution and prior to installation of FIBs 46 within PFEs 30, kernel 42 invokes flooding next hop control module 52 to transparently modify FIBs 46 as necessary based on the capabilities of the underlying PFEs 30. In this way, routing protocols 40 and kernel 42 may still utilize the logical construct of the flooding next hop identifier even when such a construct is not supported by one or more of PFEs 30.

When invoked, flooding next hop control module 52 processes the forwarding information within FIBs 46 to replace the flooding next hop identifiers as necessary. For example, for each flooding next hop, the flooding next hop control module 52 may first determine the next hop that corresponds to the respective input interface using an index assignment based on the one-to-one relationship between elemental unicast next hops (as opposed to flooding next hops) and interfaces. For example, the one-to-one relationship may be as follows:

$$\begin{cases} I_1, N_1 \\ I_2, N_2 \\ I_2, N_3 \\ I_4, N_4 \end{cases}.$$

Thus, there is a duality between interfaces and next hops in that what is modeled as an interface on packet ingress is modeled as a next hop on packet egress. In other words, each interface $I_i$ denotes an ingress port for which $N_i$ is the corresponding egress port.

For a set of interfaces $I=\{I_1, I_2, \ldots, I_n\}$ involved in a flooding list, the order of the interfaces I is known to the control and data planes. Alternatively, since each of the interfaces is a logical port, they are also each assigned an integer value and thus the set $\{I_1, I_2, \ldots, I_n\}$ can be sorted to reach a unique ordered list, $I'=\{I'_1, I'_2, \ldots, I'_n\}$ Due to the duality of interfaces and unicast next hops, this list $I'=\{I'_1, I'_2, \ldots, I'_n\}$ corresponds in a one-to-one manner with the list of unicast next hops $N'=\{N'_1, N'_2, \ldots, N'_n\}$.

Flooding next hop derivation module 56 then derives the set of split-horizon flooding next hops for each interface by removing the next hop that corresponds to the ingress interface (i.e., generating exclusion routes for each interface). For example, flooding next hop control module 52 drops the next hop at rank "k" from the list N when formulating the split-horizon flooding next hop for an interface $I_k$:

$$\begin{cases} I_1 \to \{N_2, N_3, N_4\} \\ I_2 \to \{N_1, N_3, N_4\} \\ I_3 \to \{N_1, N_2, N_4\} \\ I_4 \to \{N_1, N_2, N_3\} \end{cases}.$$

Flooding next hop control module 52 may insert the complete list of next hops for which to flood traffic for each ingress interface. Alternatively, flooding next hop control module 52 may produce additional forwarding information storing the derived list of split-horizon flooding next hops and replace the flooding next hop label with a new label $N_{F1}$-$N_{F4}$ mapped to the respective list split-horizon flooding next hops:

$$\begin{cases} I_1 \to \{N_2, N_3, N_4\} = N_{F1} \\ I_2 \to \{N_1, N_3, N_4\} = N_{F2} \\ I_3 \to \{N_1, N_2, N_4\} = N_{F3} \\ I_4 \to \{N_1, N_2, N_3\} = N_{F4} \end{cases}.$$

Flooding next hop control module 52 then updates FIBs 46 as necessary based on the capabilities of the underlying PFEs 30, i.e., their ability to support flooding next hop identifiers.

Kernel 42 then installs FIBs 48 to PFEs 30. In this manner, routing protocols 40 need not maintain the routing information of RIB 44 to expressly generate and store all of the exclusion routes to which to flood L2 network traffic.

Where routing node 20 has multiple PFEs 30, PFEs 30 may need to agree on the indices of the split-horizon flooding next hops across PFEs 30. When the derivation of split-horizon flooding next hops is performed within routing engine 26, flooding next hop control module 52 may rank the interfaces and corresponding next hops as described above (e.g., by interface number or port number) to ensure that all of PFEs 30 agree about specific split-horizon flooding next hops and their index assignments.

In other embodiments, the packet forwarding functionality may be distributed among interface cards (IFCs) 31 and 32 (FIG. 2). In this case, routing engine 26 may similarly perform the split-horizon flooding next hop derivation, and provide the flooding next hops to packet forwarding components in each of IFCs 31, 32.

After the split-horizon flooding next hops are generated and installed within PFEs 30, data planes 50 of routing node 20 (e.g., data plane 50A of PFE 30A) may receive a L2 VPLS packet having a destination address that routing node 20 has not yet learned. For example, routing node 20 may receive the packet via an interface of PFE 30A. PFE 30A references FIB 48A using the interface as a key to obtain a split-horizon flooding next hop identifier and obtain a list of the next hops associated with the split-horizon flooding next hop identifier, and floods the L2 VPLS packet to all of the distinct next hops associated with the split-horizon flooding next hop. In this manner, routing node 20 may avoid loops in the forwarding plane by following the split-horizon rule, even where one or more of PFEs 30 includes a first-generation chipset.

In some embodiments, routing node 20 may additionally include second- or third-generation packet forwarding engine technology. For example, one or more of PFEs 30 may comprise PFE chipsets capable of identifying the interface from which a packet ingressed, on-the-fly prior to flooding the packet, and removing the next hop associated with the interface from the set of next hops to which the packet is flooded. Thus, different PFEs 30 of routing node 20 may apply different techniques for split-horizon flooding. Flooding next hop control module 52 of routing engine 26 may provide FIBs 48A-48N that are tailored to the requirements of respective PFEs 30A-30N. For example, where PFE 30A is a first-generation chipset and PFE 30N is a third-generation chipset, routing engine 26 may generate FIB 48A differently than FIB 48N according to the specific split-horizon next hop functionality of the FIBs 48. The techniques of the invention may allow routing node 20 to present a unified, seamless abstraction of split-horizon flooding at the application layer, such that routing protocols 40 are unaware of the different flooding techniques being used at the packet forwarding level. This may be easier to program to, and may allow for better scaling when interfaces fail, join, or leave the VPLS domain.

An alternative embodiment in which PFE 30A internally derives the split-horizon flooding next hops will now be described with respect to FIG. 3B. Flooding next hop derivation module 54 of PFE 30A may operate as a 'slave' flooding next hop control module based on information provided by the 'master' flooding next hop control module 52 of routing engine 26. Flooding next hop derivation module 56 of PFE 30A may obtain routes and next hops from flooding next hop control module 52 of routing engine 26, e.g., via FIB 46A. For example, flooding next hop derivation module 56 may obtain the following routes and next hop information from FIB 46A:

$$\begin{cases} I_1 \to FNH \\ I_2 \to FNH \\ I_3 \to FNH \\ I_4 \to FNH \end{cases} \text{ and } FNH = \{N_1, N_2, N_3, N_4\},$$

where $I_1$-$I_4$ are interfaces of PFE 30A having indices 1-4, and where FNH is a flooding next hop that represents the set of $N_1$-$N_4$ individual distinct next hops.

As above, the flooding next hops FNH for each interface do not conform to the split-horizon rule, because each flooding next hop FNH includes the next hop corresponding to the ingress interface. In this embodiment, flooding next hop derivation module 56 of PFE 30A is able to derive the set of split-horizon flooding next hops for each of interfaces $I_1$-$I_4$ based on this information received from flooding next hop control module 52 of routing engine 26.

Flooding next hop derivation module 56 ranks the next hop that corresponds to each interface based on the one-to-one relationship between the next hops and interfaces by index. Flooding next hop derivation module 56 then derives a split-horizon flooding next hop for each interface by removing the next hop that corresponds to the ingress interface from the set of next hops of $N_F$ (i.e., generating exclusion routes for each interface). Flooding next hop derivation module 56 may update FIB 48A as necessary to store the derived split-horizon flooding next hop for each interface. Each of PFEs 30 that comprises a first-generation chipset may include a corresponding 'slave' flooding next hop derivation module that receives information from 'master' flooding next hop derivation module 52 and operates accordingly to internally derive split-horizon flooding next hops for the respective ones of PFEs 30. In addition, flooding next hop control module 52 may generate FIBs 48 differently depending on the type of chipset included within PFE 30.

Flooding next hop derivation module 56 may obtain indices for the new split-horizon flooding next hops. The indices of the new split-horizon flooding next hops may have to be consistent across all of PFEs 30. This may be achieved in a variety of ways. Each of the PFEs 30 can follow the process described above to generate the same exclusion lists, but the PFEs 30 need to agree on the next hop indices $N_{Fn}$ assigned to the lists. As one example, flooding next hop derivation module 56 within one of PFEs 30 may do an upcall to flooding next hop control module 52 within kernel 42 of routing engine 26 to request that an index be assigned for one or more derived split-horizon flooding next hop lists (e.g., $\{N_1, N_2, N_3\}$). When flooding next hop control module 52 receives such a request for a split-horizon flooding next hop list for the first time, flooding next hop control module 52 allocates an index (e.g. NF4) and forms a cache of the corresponding mapping of list to index. When any other PFE 30 asks for an index for split-horizon flooding next hop list for which an entry is already present in the cache (i.e., another PFE 30 has already asked for an index for that list), flooding next hop control module 52 refers to the cache and returns the index for that split-horizon flooding next hop list according to the mapping. In this manner, when flooding next hop control module 52 has seen the same split-horizon flooding next hop before, flooding next hop control module 52 assigns the same index as was assigned before. If flooding next hop control module 52 has not seen the split-horizon flooding next hop before, flooding next hop control module 52 assigns a new index. This ensures that all of PFEs 30 have the same value for the next hop indices for split-horizon flooding.

As another example, PFEs 30 may include a master PFE 30 that assigns the indices and keeps track of the assignments across all of PFEs 30. As a further example, PFEs 30 may exchange information and assign indices based on a distributed consensus protocol among the PFEs 30. As another example, flooding next hop control module 52 may drive the mapping of split-horizon next hop lists to indices into PFEs 30. However, with this method, flooding next hop control module 52 needs to know the specifics of the PFEs 30 (i.e., which can do split-horizon flooding natively, which cannot).

After the split-horizon flooding next hops are derived and assigned indices, RE interface module 54 may provide the new split-horizon flooding next hops to flooding next hop control module 52 of routing engine 26. Flooding next hop control module 52 updates the routes within RIB 44 and generates new FIBs 46 as necessary. The updated routes map each of the interfaces to the respective derived split-horizon flooding next hop, as opposed to associating all of the interfaces with the same flooding next hop. In this manner, the routing engine need not store all of the exclusion routes. Flooding next hop control module 52 installs FIBs 48 to PFEs 30 in accordance with FIBs 46.

As another example, the split-horizon flooding next hop derivation described above may be performed by flooding next hop control module 52 in kernel 42 of routing engine 26. Since routing engine 26 is a central node with respect to each of PFEs 30, flooding next hop control module of routing engine 26 may keep track of which indices are provided for each flooding next hop.

Figure 4A:
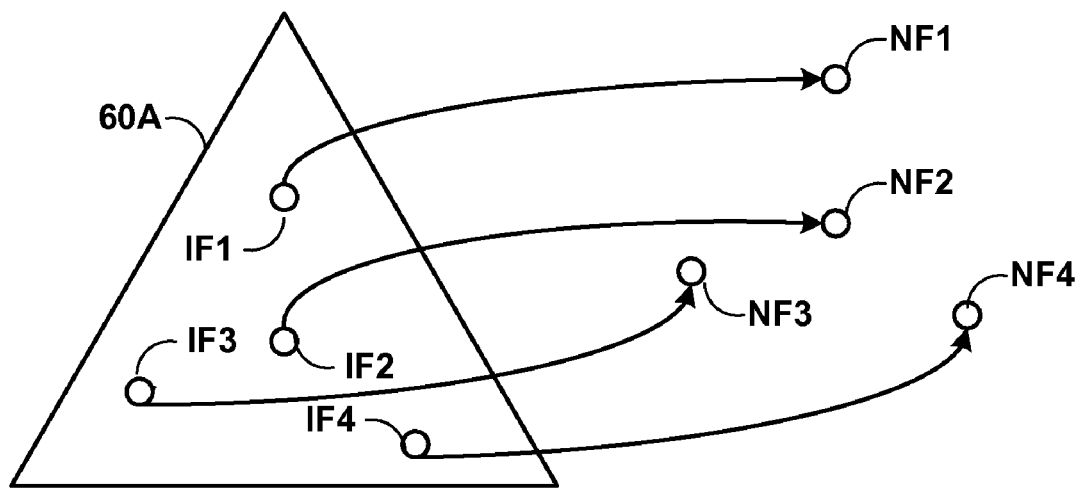
FIGS. 4A-4B are block diagrams illustrating forwarding information bases (FIBs) maintained by packet forwarding engines in the form of radix trees.
Figure 4B:
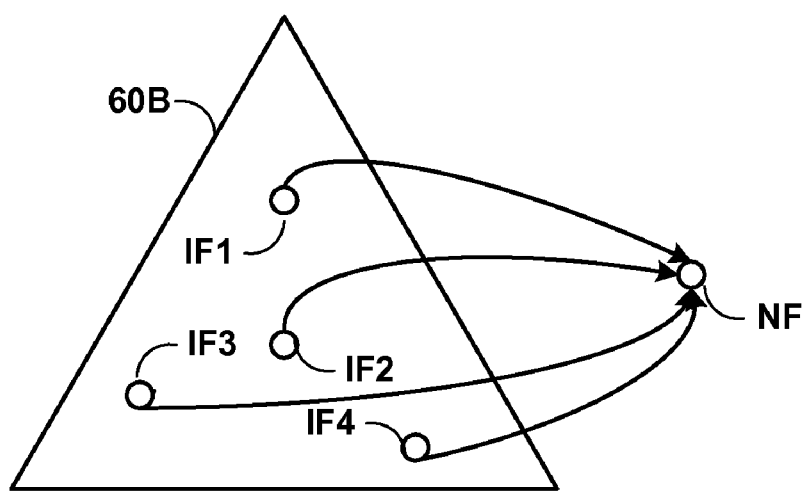

FIGS. 4A-4B are block diagrams illustrating example forwarding information bases (FIBs) 60A and 60B maintained by PFEs 30 in the form of radix trees. FIB 60A of FIG. 4A is a representation of a FIB that may be generated and installed within a PFE having a first-generation chipset (e.g., PFE 30A), and FIB 60B is a representation of a FIB that may generated and installed within in a second- or third-generation chipset (e.g., PFE 30N). FIBs 60A-60B includes forwarding information for each interface of PFEs 30A and 30N by identifying next hop(s) to which a packet received on the respective interface should be forwarded. For example, nodes of the radix tree of FIB 60A have been generated to include data specifying split-horizon flooding next hop identifiers NF1-NF4:

$$\begin{cases} I_1 \rightarrow NF1 \\ I_2 \rightarrow NF2 \\ I_3 \rightarrow NF3 \\ I_4 \rightarrow NF4 \end{cases}$$

where NF1-NF4 correspond to split-horizon flooding next hop exclusion lists as described above (e.g., $\{N_1, N_2, N_3\}$).

In addition, FIB. 60A has been generated to include data external to the radix tree that stores the specific next hops to which to flood packets. That is, the pointer for the node associated for the first interface $I_1$ includes the split-horizon flooding next hop identifier NF1, which points to a data set specifying next hops {NH2, NH3 and NH4}. In this manner, the forwarding information of FIB 60A includes all information for split-horizon flooding without placing any burden on the PFE for on-the-fly derivation.

In contrast, FIB 60B utilizes flooding next hop identifiers. In this case, the nodes of the radix tree corresponding to all interfaces $I_1$-$I_4$ include a single flooding next hop identifier FNH to logically represent that L2 traffic for those interfaces is to be flooded on the corresponding L2 network:

$$\begin{cases} I_1 \rightarrow FNH \\ I_2 \rightarrow FNH \\ I_3 \rightarrow FNH \\ I_4 \rightarrow FNH \end{cases}.$$

Thus, FIB 60B may utilize fewer identifiers and occupy less memory resources. Moreover, the routing protocols and other higher-level software of the routing engine need not be configured to handle the complexities of generating the routing and forwarding information in compliance with the split-horizon requirements. When forwarding traffic, the PFE using second-generation chipsets processes FIB 60B on-the-fly to (i.e., at the time of forwarding traffic) to derive the specific next hops to which to flood the traffic.

Figure 5:
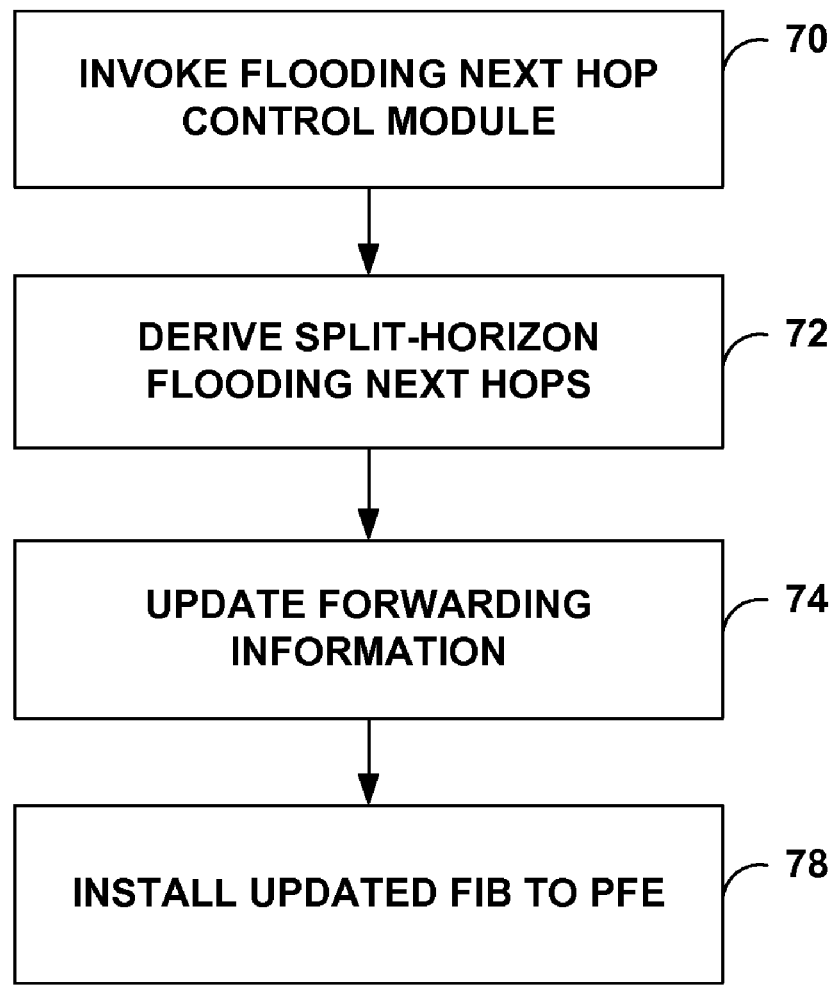
FIG. 5 is a flow chart illustrating example operation of a PFE and a routing engine of a routing node.

FIG. 5 is a flow chart illustrating example operation of PFE 30A and routing engine 26 of routing node 20. In this example, PFE 30A comprises a first-generation chipset that requires that installed forwarding information specify a plurality of next hops to which to flood copies of received packets, and is not capable of deriving the plurality of next hops to which to flood the copies of the packet from a single flooding next hop identifier that represents all of the next hops within the L2 network. Although PFE 30A lacks hardware support for deriving the plurality of next hops to which to flood the copies of the packet from a single flooding next hop that represents all of the next hops within the L2 network, the techniques of the invention nonetheless allow PFE 30A to set up split-horizon flooding next hops.

As described above, the split-horizon flooding next hops may be derived at the control plane of routing engine 26, or internal to PFEs 30. For purposes of example, FIG. 5 will be described with respect to the embodiment in which the derivation is performed at the control plane of routing engine 26. After route resolution and prior to installation of forwarding information within the underlying PFEs, kernel 42 seamlessly invokes flooding next hop control module 52 to process and modify FIB 46A based on the capabilities of PFE 30A (70). As discussed, a one-to-one relationship exists between the interfaces and the elemental unicast next hops. Based on this information, flooding next hop control module 52 of routing engine 26 processes the forwarding information to identify any use of flooding next hop identifiers, performs flood list expansion to logically expand the flooding next hop identifiers maintained by the high-level control plane software into the complete list of next hops within the L2 network, and derives the particular split-horizon flooding next hops to exclude a next hop associated with the input interface (72). For example, flooding next hop control module 52 determines a next hop that corresponds to each interface based on the one-to-one relationship. Flooding next hop control module 52 then derives a split-horizon flooding next hop for each interface by removing the next hop that corresponds to the ingress interface from the set of next hops of the flooding next hop identifier.

Flooding next hop control module 52 may then modify the forwarding information to replace the flooding next hop identifier with the full, derived list of split-horizon next hops (74). Alternatively, flooding next hop control module 52 may modify the forwarding information to replace each flooding next hop identifier with a corresponding split-horizon flooding next hop identifier that indexes a list of the particular split-horizon next hops stored external to the radix tree.

Flooding next hop control module 52 then communicates FIBs 48 to RE interface module 54 for installation within the respective data plane 50 of PFEs 30 (78).

After the split-horizon flooding next hops are generated and installed within PFEs 30, routing node 20 may receive a L2 VPLS packet having a destination address that routing node 20 has not yet learned. For example, routing node 20 may receive the packet via an interface of PFE 30A. PFE 30A references FIB 48A using the interface as a key to obtain the split-horizon flooding next hop, and floods the L2 VPLS packet to the split-horizon flooding next hop. In this manner, routing node 20 may avoid data loops in the forwarding plane by following the split-horizon rule, even where one or more of PFEs 30 includes a first-generation chipset.

Various embodiments of the invention have been described. These and other embodiments are within the scope of the following claims.

The invention claimed is:

1. A routing node comprising:
an interface that receives a packet from a network;
a forwarding component;
a control unit that installs forwarding information within the forwarding component;
wherein, based on stored forwarding information, the forwarding component floods copies of the packet to a plurality of next hops associated with a same layer two (L2) network as the interface on which the packet was received, wherein the plurality of next hops excludes a next hop that corresponds to the interface on which the packet was received,
wherein the forwarding component requires that the forwarding information installed by the control unit specify the plurality of next hops to which to flood the copies of the packet and is not capable of deriving the plurality of next hops to which to flood the copies of the packet from a single flooding next hop identifier after the packet is received from the network;
a routing process executing at an application layer of the control unit that maintains routing information in accordance with routes through a network, and wherein the routing process maintains the routing information in a form that specifies the flooding next hop identifier for the L2 network; and
a flooding next hop control module that, prior to receiving the packet, automatically derives the plurality of next hops to which to flood the copies of the packet based on the flooding next hop identifier of the routing information maintained by the routing process and installs the derived plurality of next hops into the forwarding information.

2. The routing node of claim 1, wherein the flooding next hop control module operates within a kernel executing on the control unit.

3. The routing node of claim 2, wherein the flooding next hop control module assigns an index to each of the derived plurality of next hops prior to installing the derived plurality of next hops into the forwarding information.

4. The routing node of claim 1, wherein the flooding next hop control module operates within the forwarding component.

5. The routing node of claim 4, wherein the flooding next hop control module comprises a slave flooding next hop control module that automatically derives the plurality of next hops to which to flood the copies of the packet based on next hop information provided by a master flooding next hop control module that operates within a kernel executing on the control unit.

6. The routing node of claim 5, wherein the slave flooding next hop control module sends a request to the master flooding next hop control module to assign an index to each of the derived plurality of next hops prior to the slave flooding next hop control module installing the derived plurality of next hops into the forwarding information.

7. The routing node of claim 1,
wherein the forwarding component comprises a first forwarding component,
further comprising a second forwarding component that does not require that the forwarding information installed by the control unit specify the plurality of next hops to which to flood the copies of the packet and is capable of deriving the plurality of next hops to which to flood the copies of the packet from a single flooding next hop identifier after the packet is received from the network.

8. The routing node of claim 7,
wherein the flooding next hop control module automatically derives the plurality of next hops to which to flood the copies of the packets and installs the derived plurality of next hops into forwarding information associated with the first forwarding component, and
wherein the flooding next hop control module installs the flooding next hop identifier into forwarding information associated with the second forwarding component without deriving the plurality of next hops from the flooding next hop identifier.

9. The routing node of claim 1, wherein the L2 network is a virtual private local area network service (VPLS) network that transports L2 communications between remote customer networks through a service provider network as if the remote customer networks were directly attached to the same local area network (LAN).

10. A method comprising:
maintaining routing information in accordance with routes through a network in a form that specifies a flooding next hop identifier;
automatically deriving a plurality of next hops to which to flood copies of a packet received from the network based on the flooding next hop identifier of the routing information;
installing the derived plurality of next hops into forwarding information;
receiving a packet from the network via an interface;
in accordance with the forwarding information, flooding copies of the packet with a forwarding component to a plurality of next hops associated with a same layer two (L2) network as the interface on which the packet was received, wherein the plurality of next hops excludes a next hop that corresponds to the interface on which the packet was received,
wherein the forwarding component requires that the forwarding information specify the plurality of next hops to which to flood the copies of the packet and wherein the forwarding component is not capable of deriving the plurality of next hops to which to flood the copies of the packet from the single flooding next hop identifier.

11. The method of claim 10, wherein automatically deriving the plurality of next hops comprises automatically deriving the plurality of next hops with a flooding next hop control module that operates within a kernel executing on a control unit of a network device.

12. The method of claim 11, wherein installing the derived plurality of next hops into forwarding information comprises installing the derived plurality of next hops into forwarding information with the flooding next hop control module, further comprising:

assigning an index to each of the derived plurality of next hops prior to installing the derived plurality of next hops into the forwarding information.

13. The method of claim 10, wherein automatically deriving the plurality of next hops comprises automatically deriving the plurality of next hops with a flooding next hop control module that operates within a forwarding component.

14. The method of claim 13, wherein installing the derived plurality of next hops into forwarding information comprises installing the derived plurality of next hops into forwarding information with the flooding next hop control module, further comprising:

sending a request to a control unit of a network device to assign an index to each of the derived plurality of next hops prior to installing the derived plurality of next hops into the forwarding information.

15. The method of claim 10, wherein receiving the packet comprises receiving a first packet, and wherein flooding copies of the packet with a forwarding component comprises flooding copies of the first packet with a first forwarding component, further comprising receiving a second packet on an interface;

deriving, with a second forwarding component, a plurality of next hops to which to flood copies of the second packet based on a flooding next hop identifier after receiving the second packet; and flooding copies of the second packet with a second forwarding component, wherein the second forwarding component does not require that the forwarding information specify the plurality of next hops to which to flood the copies of the packet and is capable of deriving the plurality of next hops to which to flood the copies of the packet from a single flooding next hop identifier after the packet is received from the network.

16. The method of claim 10, wherein the L2 network is a virtual private local area network service (VPLS) network that transports L2 communications between remote customer networks through a service provider network as if the remote customer networks were directly attached to the same local area network (LAN).

17. A computer-readable medium comprising instructions for causing a programmable processor to:

maintain routing information in accordance with routes through a network in a form that specifies a flooding next hop identifier;

automatically derive a plurality of next hops to which to flood copies of a packet received from the network based on the flooding next hop identifier of the routing information;

install the derived plurality of next hops into forwarding information;

receive a packet from the network via an interface;

in accordance with the forwarding information, flood copies of the packet with a forwarding component to a plurality of next hops associated with a same layer two (L2) network as the interface on which the packet was received, wherein the plurality of next hops excludes a next hop that corresponds to the interface on which the packet was received, wherein the forwarding component requires that the forwarding information specify the plurality of next hops to which to flood the copies of the packet and wherein the forwarding component is not capable of deriving the plurality of next hops to which to flood the copies of the packet from the single flooding next hop identifier.

* * * * *